United States Patent [19]

Fischer

[11] Patent Number: 4,634,326
[45] Date of Patent: Jan. 6, 1987

[54] EXPANSION ANCHOR

[76] Inventor: Artur Fischer, Weinhalde 34, D-7244 Waldachtal 3, DE, Fed. Rep. of Germany

[21] Appl. No.: 738,732

[22] Filed: May 29, 1985

[30] Foreign Application Priority Data

May 29, 1984 [DE] Fed. Rep. of Germany ....... 3419968
Nov. 29, 1984 [DE] Fed. Rep. of Germany ....... 3443503

[51] Int. Cl.⁴ .......................... F16B 13/06; E04B 1/38
[52] U.S. Cl. ............................................ 411/54; 411/61;
405/259; 248/231.91; 52/704
[58] Field of Search .................... 411/21, 54, 61, 70,
411/448, 449, 469, 44; 405/259; 248/216.4,
231.91; 52/704

[56] References Cited

U.S. PATENT DOCUMENTS

| 1,452,515 | 4/1923 | Kearney et al. | 248/231.91 |
| 2,431,664 | 11/1947 | Strid | 411/61 |
| 2,498,627 | 2/1950 | Hallock | 411/449 |
| 3,965,794 | 6/1976 | Dorgnon | 411/54 |
| 4,073,212 | 2/1978 | Lerich | 411/54 |

FOREIGN PATENT DOCUMENTS

| 388131 | 2/1933 | United Kingdom | 411/61 |
| 1425852 | 2/1976 | United Kingdom | 411/54 |

Primary Examiner—Gary L. Smith
Assistant Examiner—Neill Wilson
Attorney, Agent, or Firm—Michael J. Striker

[57] ABSTRACT

An expansion anchor for anchoring in drill-holes, preferably in drill-holes having undercuts widening inwardly, comprises an expansion member having an expander cone supported at the bottom of the drill-hole, and an expansible sleeve driven onto the expander cone. The expansion member has an element for fastening or securing articles. The expansion member is punched out from sheet steel and the expander cone is rolled from a suitable flat blank. The gap provided at the outer surface of the expander cone is calibrated for closure.

5 Claims, 5 Drawing Figures

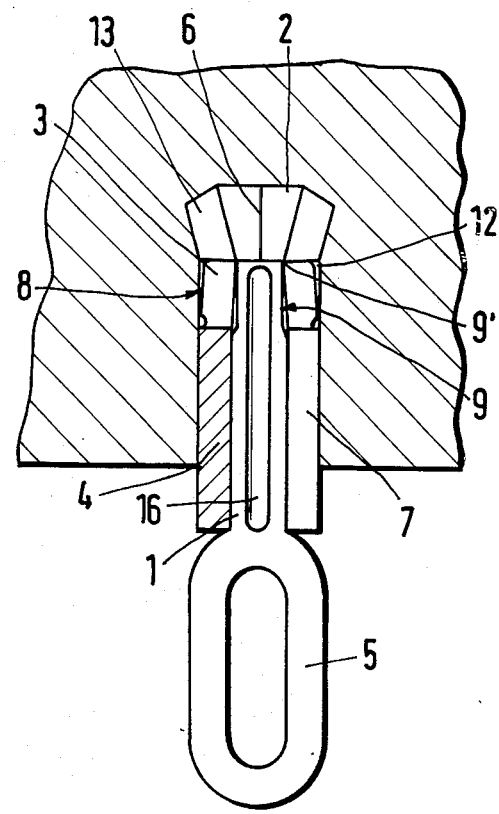
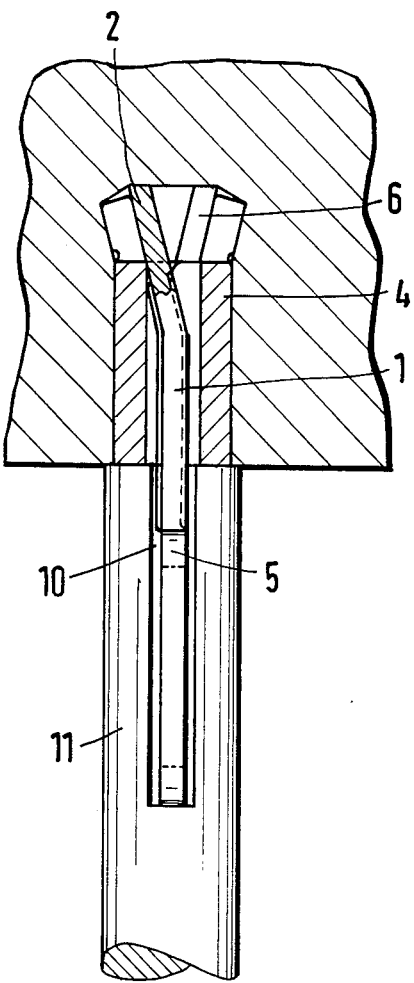
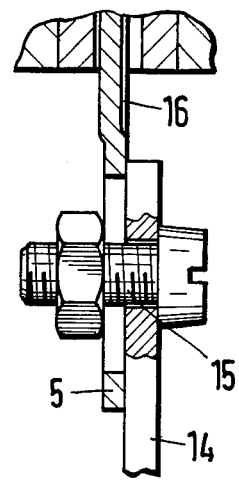

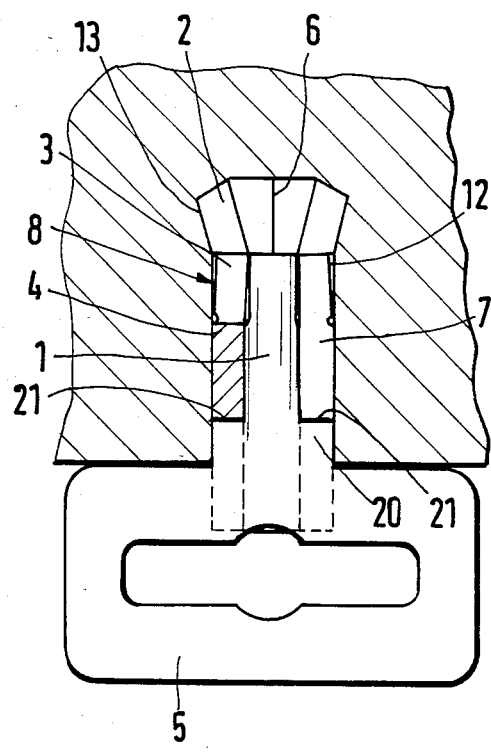
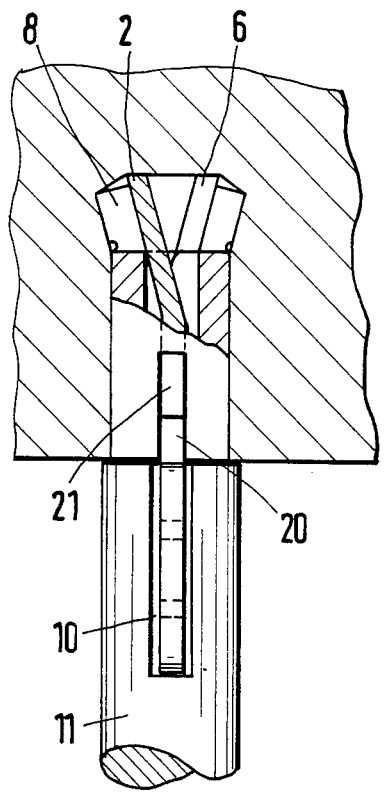

EXPANSION ANCHOR

BACKGROUND OF THE INVENTION

The present invention relates generally to an expansion anchor, and more particularly to an expansion anchor for anchoring in a hole formed in a support structure.

An expansion anchor for anchoring in drill-holes is adapted preferably for anchoring in drill-holes that have been prepared such that they have undercut portions which flare inwards.

Expansion anchors for securing an object to a support structure of the type under discussion, which comprise an expansion member supported at the bottom of the drill hole and an expander cone onto which an expansion sleeve is driven, have been known and are disclosed, for example in applicant's U.S. Pat. Nos. 3,733,959; 3,340,761; 3,955,464; 3,964,229; 3,471,183; 3,802,059; 4,028,857, etc.

Expansion anchors of the foregoing type are used in particular in ceilings, because by driving the expansible sleeve onto the expander cone of the expansion member, resting on the bottom of the drill-hole, an anchorage, that is not liable to develop cracks, is achieved. The load applied to the expansion member ensures that expansion will increase if the drill-hole becomes widened as a consequence of a crack running through the bore; this increase in expansion compensates for the loss in a pull-out force, caused by the bore opening up, or at least substantially reduces this loss.

In order, firstly, to reduce the amount of energy required to drive the expansible sleeve, and, secondly, to increase the expansion ability, it is advantageous with the expansion anchor of this kind to provide the drill-hole with an undercut that widens towards the bottom of the drill-hole. With known expansion anchors of this type, a stay bolt, having a pressed-on expander cone, is generally used as the expansion member. The thread of the stay bolt serves for fastening objects or for screwing in extension pieces, on which objects may be suspended by means of wires, perforated bands or similar means. The manufacture of the stay bolts, and especially of the extension pieces, is extremely expensive and, in view of the shallow anchoring depth that is desired, these components are too large on account of the manufacturing method.

SUMMARY OF THE INVENTION

It is an object of the present invention to provide an improved expansion anchor.

It is another object of the invention to provide an expansion anchor which is simple and inexpensive in manufacture.

These and other objects of the invention are attained by an expansion anchor for anchoring in drill holes having undercut portions widening towards bottoms of the drill holes, the anchor comprising an expansion member having an expander cone at a leading end thereof and supported at the bottom of the drill hole; an expansible sleeve being driven onto said expansion member, said expansible sleeve having elongated slots spaced from each other to form expansible portions driven onto said cone; means for securing objects, provided on said expansion member; and means for driving said expansible sleeve, said expansion member being punched-out from sheet steel and said expander cone being rolled from a respective flat blank, said expander cone having a roll gap at an outer surface thereof, said gap being calibrated for closure.

A piece of sheet steel may be used for the manufacture of the expansion pin, the expansion member being punched out together with the flat blank for the expander cone and also the corresponding means for fastening or securing articles. The expander cone is subsequently rolled up, and additionally checked for dimensional accuracy on the one hand, and for complete closure of the slot in the outer surface of the expander cone, on the other hand. By closure of the slot, the expander cone is imparted stability that precludes a deformation of the expander cone as the expansible sleeve is driven on. The conditions for expansion are therefore identical with those of an expander cone hammered from a solid material. Onto the bridging portion of the expansion member, joining the expander cone to the article-securing means, the expansible sleeve is pulled laterally, which is likewise rolled.

The expansion member may have a portion adjoining said expander cone, said portion being formed with an elongated profile notch. This profile notch stiffens the portion of the expansion part located in the expansible sleeve. The expansion member may have a narrowed portion immediately adjoining said expander cone, said expansible portions of said expansible sleeve being bent into said narrowed portion in a non-anchored position. This produces a stop for the expansible sleeve which prevents the expansible sleeve from becoming caught up as the expansion pin is driven in, and thus facilitates the process of hammering the pin in. As soon as the expander cone is resting on the bottom of the drill-hole, the stop formed by the narrowed part, which stop acts a barrier for the end face of the expansible sleeve, is overcome by a somewhat harder blow, and the expansion portions of the sleeve are driven onto the expander cone.

The securing means may be a lug formed of one piece with said expansion member.

The expansion member may include an extension of an external dimension corresponding to the diameter of said expansible sleeve, said expansible sleeve having two opportune slots starting from a trailing end face of said sleeve and accommodating said extension.

The driving means may include a pinch-like tool having a recess receiving a trailing end of said expansion member.

For the anchoring, the expansion anchor according to the invention is inserted into a predrilled hole having an undercut until the expander cone rests on the bottom of the undercut of the drill-hole. By striking the end face of the expansible sleeve, using a punch-like tool that can be pushed over the attaching lug, the expansible sleeve is then driven onto the expander cone. Articles, such as cables, pipes, covers and similar articles, can now be fastened or suspended, using the attaching lug.

The aforementioned extension accommodated in the slots of the expansible sleeve fixes the expansion member in the center of the expansible sleeve. Because the expansible sleeve lies with its outer surface closely against the wall of the drill-hole, the expansion member is also therefore supported in all directions by way of the extension. The shortened support over the longitudinal edges of the expansion part in the internal bore of the expansible sleeve is compensated by the fact that the expansion member lies, by virtue of the extension corresponding to the outer diameter of the expansible sleeve, closely against the wall of the drill-hole.

In a further supplement to the invention, the extension may rest at the bottom of at least one slot. Such an embodiment means that as the expansion anchor is positioned, by hammering on the attaching lug, the expansible sleeve, which is guided even in the case of narrow drill-holes, does not slip back over the expansion member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 a partial sectional vertical view of the expansion anchor inserted in a drill-hole;

FIG. 2 is a vertical view, partially in section, of the expansion anchor anchored in a supporting structure;

FIG. 3 illustrates an arrangement for fastening an object to the expansion anchor of the invention;

FIG. 4 is a vertical view, partially in section, of another embodiment of the expansion anchor; and FIG. 5 is a vertical view, partially in section, of the expansion anchor of FIG. 4 in the anchored condition.

DETAILED DESCRIPTION OF THE PREFERRED EMBODIMENTS

Referring now to the drawings in detail, and firstly to FIGS. 1 and 2 thereof, the expansion anchor of the invention includes an expansion member 1 having, at its end insertable into the undercut widened portion 13 of a drill-hole 12, a cone-shaped expander cone 2 and an expansible sleeve 4 which is provided over the part of its length with longitudinal slots 3 circumferentially spaced from each other in the known fashion to form expanding portions or blades 8. Sleeve 4 is rolled of a piece of sheet metal.

The expansion member 1 is punched out from a piece of sheet steel, with rolling-on a flat blank for the expander cone 2 and an attaching lug 5. Attaching lug 5 is provided for fastening or securing objects to a support structure 30. To form the expander cone 2, the corresponding flat blank on the expansion member is rolled such that the expander cone is formed. By calibration in a mold, a shape and dimensional accuracy of the expander cone 2 on the one hand, and a complete closure of a rolling gap 6 are ensured. To push the expansible sleeve 4 onto the portion of the expansion member between the expander cone 2 and the attaching lug 5, the expansible sleeve 4 is bent open at its continuous longitudinal slot 7 until it can be pulled over the portion of the expansion member.

After the expansible sleeve has sprung back, a lasting connection between the expansible sleeve 4 and the expansion member 1 is produced. If necessary, the sleeve 4 may be compressed, wherein simultaneously the expanding portions 8 of sleeve 4 are bent into a narrowed portion 9 provided on the expansion member 1. This produces a stop preventing the expansible sleeve 4 from becoming caught up as it is driven into the hole.

To anchor the expansion anchor in the hole of structure 30, a punch-like tool 11 is provided, which has a slot 10 matched to and receiving the attaching or fastening lug 5, with which tool expansible sleeve 4 is hammered on its end face. As a result the opposite end face of the expansible sleeve 4 strikes against the stop 9' formed on the narrowed portion 9, and the expansion member 1 is pushed into the drill-hole 12 until the expander cone 2 rests against the bottom of the drill-hole. After overcoming the stop 9' of the narrowed portion 9 of the expansion member 1 by a somewhat harder blow, the expanding portions 8 of sleeve 4 are driven into the gap between the outer surface of the expander cone 2 and the wall of the undercut 13 of the drill-hole 12, and thus the expansion anchor is anchored in the drill-hole 12.

The attaching lug 5 of the expansion member 1 serves as means for fastening or securing objects. Depending on the design of the attaching lug 5, wires or perforated bands 14 may be slipped through it or fastened to it by means of a fastening screw 15. To render the expansion member 1 rigid, a longitudinally extending profile-notch 16 is formed in it between the expander cone 2 and the attaching lug 5.

To support the expansion member in the expansible sleeve 4 at right angles to the plane of the lug 5, the modified expansion member 1, shown in FIGS. 4 and 5, is provided with an extension 20 adjoining the lug. The external dimension of extension 20 corresponds to the diameter of the expansible sleeve 4. To accommodate extension 20, the expansible sleeve 4 has two opposing slots 21 that start from the rear end face of the expansible sleeve 4. One of these slots is aligned with the continuous longitudinal slot 7 of the expansible sleeve 4. The inner width of the longitudinal slot 7 may vary from that of each slot 21. The length of the slots 21 accommodating the extension 20 is so selected that the extension 20 rests at the bottom of these slots.

It will be understood that each of the elements described above, or two or more together, may also find a useful application in other types of expansion anchors differing from the types described above.

While the invention has been illustrated and described as embodied in a an expansion anchor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An expansion anchor for anchoring in drill holes having undercut portions widening towards bottoms of the drill holes, the anchor comprising an expansion member having an expander cone at a leading end thereof and supported at the bottom of the drill hole; an expansible sleeve being driven onto said expansion member, said expansible sleeve having elongated slots spaced from each other to form expansible portions driven onto said cone; means for securing objects, provided on said expansion member; and means for driving said expansible sleeve, said expansion member being punched-out from sheet steel and said expander cone being rolled from a respective flat blank, said expander cone having a roll gap at an outer surface thereof, said gap being calibrated for closure, said expansion member having a narrowed portion immediately adjoining said expander cone, said expansible portions of said expansible sleeve being bent into said narrowed portion in a non-anchored position.

2. The anchor as defined in claim 1, wherein said expansion member has an elongated portion between said expander cone and said securing means, said elongated portion being formed with a profile notch.

3. The anchor as defined in claim 1, wherein said securing means is a lug formed of one piece with said expansion member.

4. The anchor as defined in claim 3, wherein said expansion member includes an extension having an external dimension corresponding to the diameter of said expansible sleeve, said expansible sleeve having two opposing slots starting from a trailing end face of said sleeve and accommodating said extension.

5. The anchor as defined in claim 1, wherein said driving means include a punch tool having a recess receiving a trailing end of said expansion member.

* * * * *